(12) United States Patent
Steentjes

(10) Patent No.: US 6,360,449 B1
(45) Date of Patent: Mar. 26, 2002

(54) INCREMENTAL ENCODER HAVING ABSOLUTE REFERENCE MARKS

(75) Inventor: Hendrikus Bernardus Maria Steentjes, Gaanderen (NL)

(73) Assignee: N.V. Nederlandsche Apparatenfabriek NEDAP, Groenlo (NL)

( * ) Notice: Subject to any disclaimer, the term of this patent is extended or adjusted under 35 U.S.C. 154(b) by 0 days.

(21) Appl. No.: 09/308,942

(22) PCT Filed: Nov. 27, 1997

(86) PCT No.: PCT/NL97/00654

§ 371 Date: Aug. 9, 1999

§ 102(e) Date: Aug. 9, 1999

(87) PCT Pub. No.: WO98/23921

PCT Pub. Date: Jun. 4, 1998

(30) Foreign Application Priority Data

Nov. 27, 1996 (NL) .............................................. 1004624

(51) Int. Cl.$^7$ .............................................. G01D 21/00
(52) U.S. Cl. .......................................... 33/613; 33/1 PT
(58) Field of Search ................................ 33/1 PT, 1 N, 33/613, 534

(56) References Cited

U.S. PATENT DOCUMENTS

| | | | |
|---|---|---|---|
| 2,944,157 A | * 7/1960 | McAuslan et al. | 33/1 PT |
| 3,568,629 A | 3/1971 | Porter | |
| 4,367,589 A | * 1/1983 | Mainka et al. | 33/1 N |
| 4,495,700 A | * 1/1985 | Ernst | 33/1 N |
| 4,922,620 A | * 5/1990 | Terragni | 33/1 N |
| 5,119,670 A | 6/1992 | Whitehorn et al. | |
| 5,301,434 A | * 4/1994 | Imaizumi | 33/1 PT |

FOREIGN PATENT DOCUMENTS

| | | | |
|---|---|---|---|
| DE | 34 16 090 | 9/1985 | |
| EP | 539 602 | 5/1993 | |
| EP | 684 452 | 11/1995 | |
| JP | 62-293122 | * 12/1987 | 33/1 N |

OTHER PUBLICATIONS

Patent Abstracts of Japan, vol. 175 (P–141), Sep. 9, 1982 and JP 57 09402 (Aisin Seiko Co. Ltd.: other: 01) Jun. 7, 1982.
Patent Abstract of Japan, vol. 009, No. 009 (P–327) Jan. 16, 1985 and JP 59–159015 (Matsushita Denki Sangyo KK) Sep. 8, 1984.
Patent Abstracts of Japan, vol. 006, No. 030 (P–103), Feb. 23, 1982 and JP 56 151311 (Hitachi Ltd) Nov. 24, 1981.

* cited by examiner

*Primary Examiner*—Andrew H. Hirshfeld
(74) *Attorney, Agent, or Firm*—Merchant & Gould P.C.

(57) ABSTRACT

The invention provides a method for realizing a highly compact system for determining a position. This position-determination method can be used for measuring the displacement of the panel of a sliding roof, or the displacement of a window in a side-window control in a motorcar. In general, this method can be used for measuring displacements of objects. For determining a position, a gear wheel is used which is driven by the drive cable and which drives, by means of an eccentric, a second wheel having substantially the same center as the first wheel. As a result, this second wheel rotates much more slowly than the first wheel. Mounted on a ring on the first wheel are crenellations which rotate through an optical slotted sensor whereby incremental position information is provided. On a concentric second ring on the wheel, with only one crenellation, another slotted sensor is disposed, which provides a reference pulse which, however, occurs several times over the total distance. On the second gear, a crenellation is provided as well. By means of a slotted sensor, this crenellation is also scanned. Together with the reference pulse from the sonsor around the second ring of the first wheel, an unequivical, accurate reference pulse can now be made. A combination of two gear wheels always occupies much more space than one gear wheel. The invention offers the advantage of two gear wheels (a large number of distance pulses with an accurate reference pulse) and the space occupation of one gear wheel. This invention will be of great advantage in particular in places where there is little space for a control.

11 Claims, 2 Drawing Sheets

INCREMENTAL ENCODER HAVING ABSOLUTE REFERENCE MARKS

CROSS-REFERENCES TO RELATED APPLICATIONS

Not Applicable

STATEMENT REGARDING FEDERALLY SPONSORED RESEARCH OR DEVELOPMENT

Not Applicable

REFRNENCE TO A "MICROFICHE APPENDIX"

Not Applicable

BACKGROUND OF THE INVENTION

1. Field of the Invention

The invention provides a method for realizing a highly compact system for determining the position of a movable part for selectively closing or releasing an opening, in particular the panel of a sliding roof or a motor-driven window in a door of a motorcar or truck, in respect of which it is important to know the position of the roof panel in order to, for instance, cause the panel to stop at a particular location.

2. Description of the Related Art

Devices are known which comprise external sensors such as Hall-effect sensors, disposed at a magnet with one or more pairs of poles which is/are mounted around the motor shaft or on a shaft connected to the motor shaft. Also, devices are known which comprise external sensors such as optical slotted sensors operated by crenellations, which are again mounted on or against a wheel driven, with or without a transmission, by the motor shaft. The motor can move the roof panel for instance via a drive cable. Via this drive cable, the wheel with the crenellations can again be driven.

The drawback of such systems is that if gear wheels are involved, they usually turn out to be large.

BRIEF SUMMARY OF THE INVENTION

The invention enables the use of several wheels, which nevertheless do not occupy more space than the space occupied by one wheel. In particular if the building-in space is limited, this will be highly advantageous.

For determining the position, a gear wheel driven by the drive cable is used, which gear wheel drives, by means of an eccentric, a second wheel having substantially the same center as the first one. As a result, this second wheel rotates far more slowly than the first wheel.

Mounted on a ring on the first wheel are crenellations rotating through an optical slotted sensor whereby incremental position information is provided.

On a concentric second ring on the first wheel, a crenellation is arranged. This crenellation also rotates through a slotted sensor, which produces a reference pulse which, however, occurs several times over the entire distance. On the second gear wheel, too, a crenellation is arranged. By means of a slotted sensor, this crenellation is scanned, too. Together with the reference pulse from the sensor around the second ring of the first wheel, an unequivocal, accurate reference pulse can now be made.

A combination of two gear wheels always takes up much more space than one gear wheel.

The invention has the advantage of two gear wheels, i.e. a large number of distance pulses with an accurate reference pulse, and the space occupation of one gear wheel. In particular in places where there is little space for a control, this invention will be highly advantageous.

BRIEF DESCRIPTION OF THE SEVERAL VIEWS OF THE DRAWINGS

Hereinafter, the invention will be further described with reference to the accompanying drawings.

DETAILED DESCRIPTION OF THE INVENTION

Figure 1:
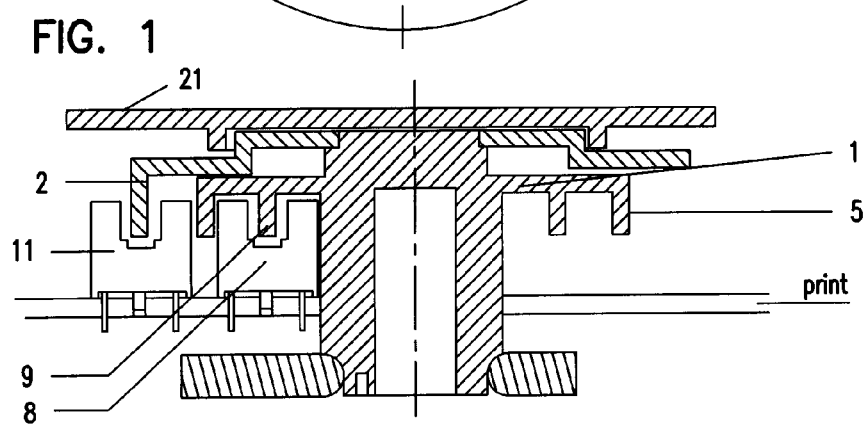
FIG. 1 shows the arrangement with the gear wheels, sensors and drive cable.
Figure 4:
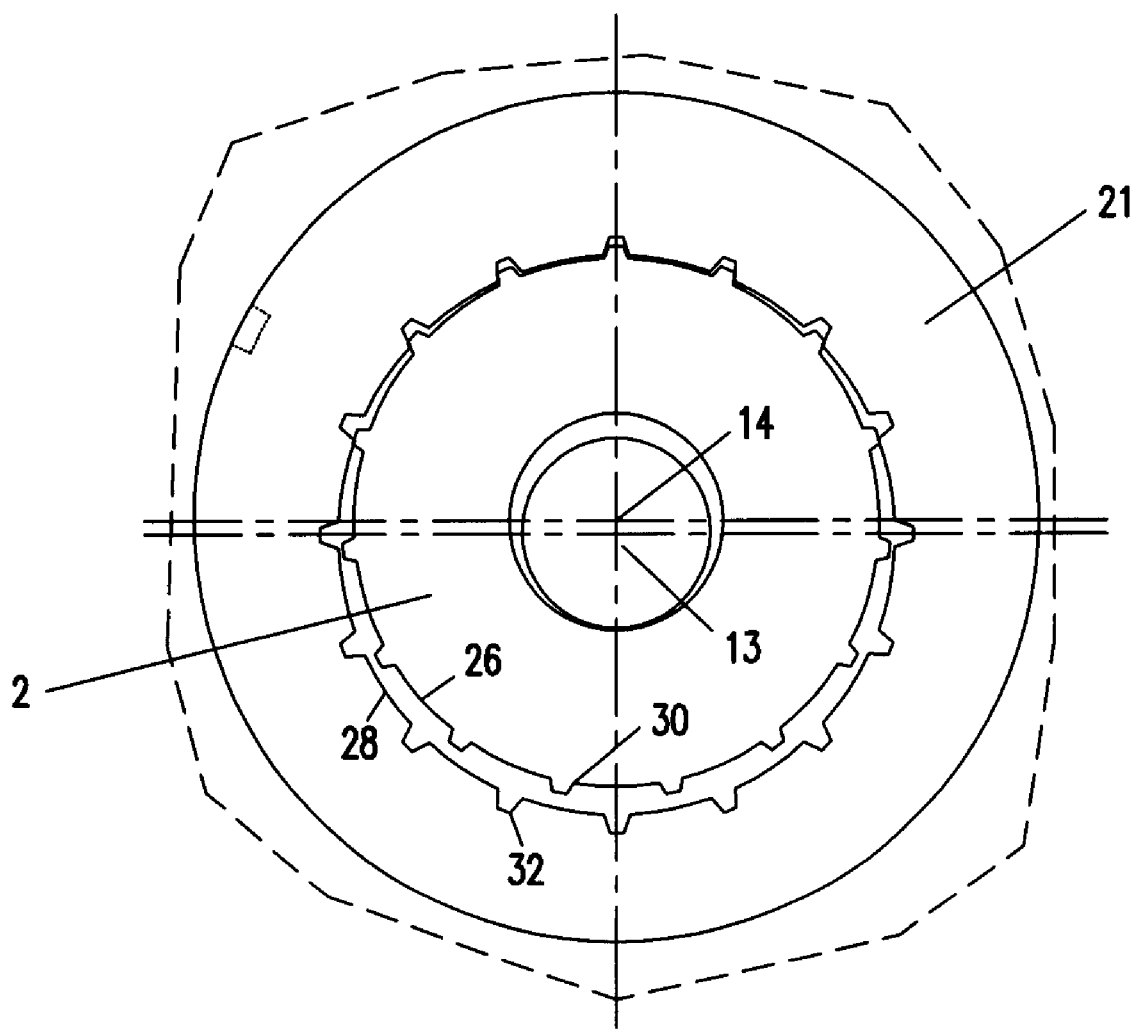
FIG. 4 shows gear wheel 1 and gear wheel 2, viewed from above, in an alternative embodiment according to FIG. 1.

A drive cable 3 as shown in FIG. 1 drives a wheel 1 via a gear ring 4. The wheel 1 has sensor recognition elements in the form of crenellations 5 which move through the sensors 6 and 7. These two sensors 6, 7 provide quadrature detection, i.e. they provide 90° displaced incremental pulse information. The direction of rotation of wheel 1 can thus be determined. A sensor recognition element in the form of a crenellation 8 of wheel 1 rotates through a slotted sensor 9 and thus provides a reference pulse. This reference pulse occurs only once per revolution of the wheel 1.

Figure 3A:
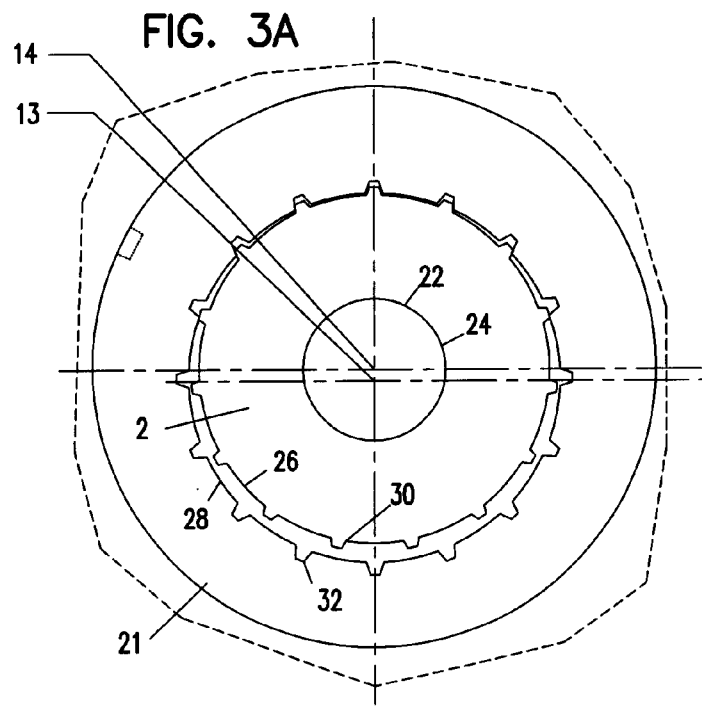
FIG. 3 shows gear wheel 1 and gear wheel 2, viewed from above.
Figure 3B:
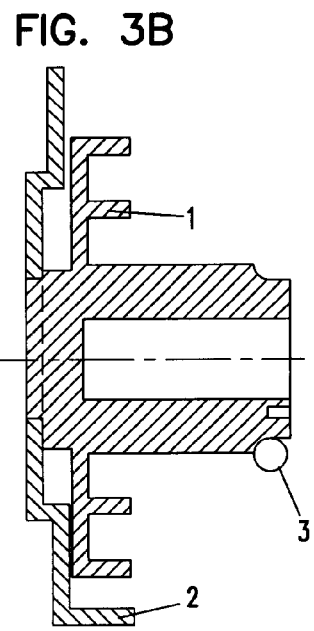
Figure 2A:
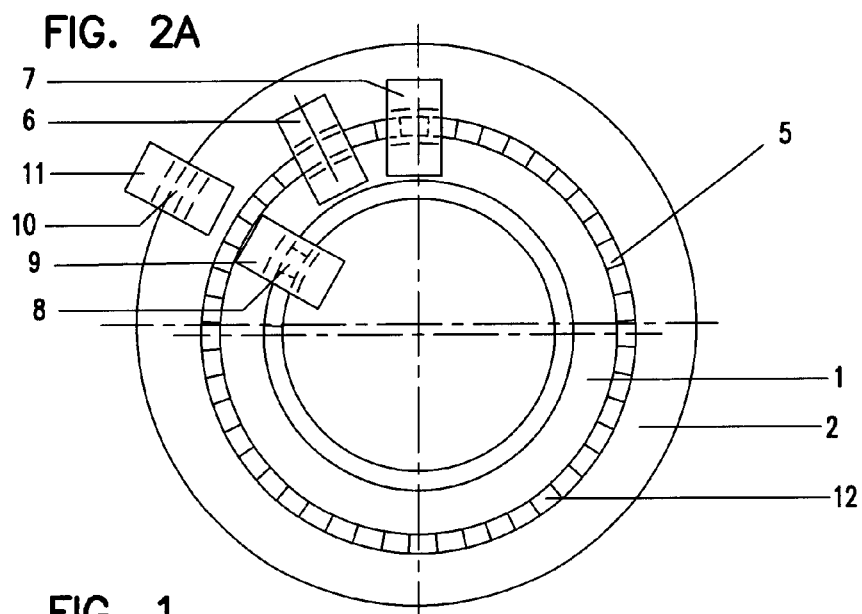
FIG. 2 shows the same arrangement, viewed from below.
Figure 2B:
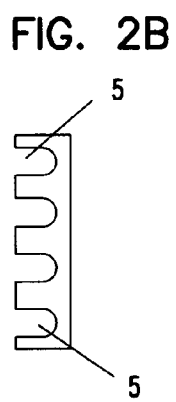

As FIGS. 2 and 3 show, an outer edge 22 of the first wheel 1 drives an inner edge 24 of a second wheel 2, in this case a gear wheel 2, with the first wheel 1 and the second wheel 2 being positioned eccentrically relative to each other, so that the rotation of the first wheel 1 entails a reduced rotation of the second wheel 2. The diameter of the outer edge 22 is slightly less than the diameter of the inner edge 24. An outer edge 26 of the wheel 2 runs along an inner edge 28, closed in itself, of a fixed part 21. The outer edge 26 of the second wheel 2 comprises a first number of teeth 30, the inner edge 28 of the fixed part 21 comprises a second number of teeth 32 which is larger than the first number of teeth.

The above implies that the wheel 2 rotates much more slowly than the wheel 1. This is visible in particular in FIG. 3. In FIG. 3, gear wheel 2 has 15 teeth 30 and the firm world, i.e. the fixed part 21, has 16 teeth 32 (dotted line). Each revolution of the gear wheel 1 will cause the gear wheel 2, arranged eccentrically relative to the gear wheel 1, to travel one tooth and hence 1/16 revolution. Here, the ratio of transformation is 16.

FIG. 2 shows that the gear wheel 2 has only one sensor recognition element in the form of one crenellation 10. This element is sensed by a slotted sensor 11. Thus, an absolute reference pulse is made which, however, is inaccurate. As it is, gear wheel 2 rotates much more slowly than gear wheel 1. The signal of crenellation 8 on gear wheel 1 is sensed by the slotted sensor 9 and can now be used for making a more accurate reference pulse. In one revolution of gear wheel 2 this pulse of sensor 9 now occurs 16 times. In this manner, a combination of the signals of sensor 9 and sensor 11 provides a reference pulse which is 16 times more accurate than that of sensor 11 alone. The absolute zero can now for instance be defined as being that position in which sensor 11 detects crenellation 10, while sensor 9 detects crenellation 8. Of course, the output signals of the sensors 6 and 7 will not only be used for determining the direction of rotation of the first wheel, but also for an accurate determination of the rotational position of the first wheel. As stated above, crenellations 8, 10 in combination with sensors 9, 10 determine the absolute zero, while by counting the number of pulses of the sensors 6 and/or 7 from this absolute zero, the exact position of the first wheel can be determined. Of course, the output signal of the sensor 9 can then be used as an extra check.

For completeness' sake, it is observed that in the drawing, the axis of rotation of the first wheel is designated by reference numeral 13, while the axis of rotation of the second wheel is designated by reference numeral 14. During rotation of the second wheel 2, the center 14 of this wheel moves along a circular path. The axis of rotation 13 is fixedly disposed relative to the fixed part 21. In this example, the diameter of the circular outer edge 22 of the first wheel is slightly less than the diameter of the inner edge 24 of the second wheel 2. Hence, the axis of rotation 14 of the second wheel is eccentric relative to the axis of rotation 13 of the first wheel. The center of the circular outer edge 22 of the first wheel substantially coincides with the axis of rotation 14. As a consequence, rotation of the second wheel will cause this inner edge 22 of the first wheel to move up and down.

However, it is also possible to design the diameter of the first wheel to be considerably smaller than the inside diameter of the second wheel. If the diameter of this outer edge of the first wheel is smaller by the same size as the difference between the diameter of the outer edge of the second wheel and the diameter of the inner edge of the fixed part, the center 13 of the circular inner edge 22 will coincide with the axis of rotation 13 of the first wheel. This axis of rotation 13 is fixedly disposed relative to the fixed part 21. During rotation of the second wheel, the center 14 of the this wheel runs along a circular path.

The invention is by no means limited to the embodiments outlined hereinabove. For instance, the second wheel may be omitted when the diameter of the first wheel is rendered much and much larger. In that case, the sensor 9 determines the absolute zero and by means of the sensors 6 and/or 7, by counting the number of crenellations 5 that are successively detected by these sensors, the rotational position of the first wheel relative to the absolute zero is determined. Of course, this implies that a complete revolution of the first wheel entails a much greater displacement of the drive cable 3 than in the case of the above-described embodiment. Also in the case where the first wheel has a larger diameter, the number of crenellations 5 will increase proportionally, so as to maintain a sufficiently great accuracy.

It will be understood that the slotted sensor may be designed as an optical slotted sensor. It is also possible to replace the sensor by a separate light source and a separate light detector. In addition, the sensor may be designed as a Hall-effect-sensor. It is also possible to design the sensor as a magnetic sensor. Sensor recognition elements may be designed as crenellations, as described hereinabove, but also as magnets and/or other elements that can be detected by means of other types of sensors or similar sensors. Such variants are all understood to fall within the framework of the invention.

What is claimed is:

1. A device for operating a movable part for closing or releasing an opening, the device comprising:

a first and a second sensor and a quick-rotating first wheel and a slow-rotating second wheel;

wherein an outer edge of the first wheel drives an inner edge of the second wheel;

wherein the first and the second wheel are positioned eccentrically relative to each other so that a rotation of the first wheel entails a reduced rotation of the second wheel;

wherein the first wheel comprises a first sensor recognition element, the first sensor being adapted to detect the first sensor recognition element when the first wheel is in a predetermined rotational position; and wherein the second wheel comprises a second sensor recognition element, the second sensor being adapted to detect the second sensor recognition element when the second wheel is in a predetermined rotational position.

2. A device according to claim 1, the device further comprising at least one third sensor, the first wheel further comprising a plurality of third sensor recognition elements which, by rotation of the first wheel, can be successively detected by the third sensor being adapted to detect the third sensor recognition elements.

3. A device according to claim 1, wherein an outer edge of the second wheel runs along an inner edge of a fixed part, the inner edge of the fixed part being closed.

4. A device according to claim 3, wherein the outer edge of the second wheel comprises a first number of teeth, and the inner edge of the fixed part comprises a second number of teeth which is larger than the first number of teeth.

5. A device according to claim 1, wherein the first wheel is arranged to be driven upon operation of said movable part.

6. A device according to claim 1, wherein at least one of the sensor recognition elements comprises a crenellation.

7. A device according to claim 1, wherein at least one of the sensors is an optical slotted sensor.

8. A device according to claim 1, wherein at least one of the sensors comprises a light source and a light detector.

9. A device according to claim 1, wherein at least one of the sensor recognition elements comprises a magnet.

10. A device according to claim 1, wherein at least one of the sensors is a Hall-effect sensor.

11. A device according to claim 1, wherein at least one of the sensors is a magnetic sensor.

* * * * *